United States Patent [19]
Eaton

[11] 3,894,550

[45] July 15, 1975

[54] ORAL DISEASE PREVENTION MOTIVATING KIT

[76] Inventor: James W. Eaton, 407 N. Broad St., Grove City, Pa. 16127

[22] Filed: June 18, 1974

[21] Appl. No.: 480,417

[52] U.S. Cl. .............................................. 132/79 E
[51] Int. Cl. ........................................... A45d 40/00
[58] Field of Search ................... 132/84, 79 E, 79 A

[56] References Cited
UNITED STATES PATENTS 2,465,946   3/1949   Velez ............................... 132/79 A
2,469,267   5/1949   Hutt et al. ........................ 132/79 E Primary Examiner—G. E. McNeill
Attorney, Agent, or Firm—Gardner J. O'Boyle; James G. O'Boyle

[57] ABSTRACT

An oral disease prevention motivating kit including a compartmented cabinet containing oral disease preventive supplies, a timer, and a program indicator for keeping daily records for each user of the oral disease preventive program.

10 Claims, 10 Drawing Figures

3,894,550

3,894,550
SHEET 2
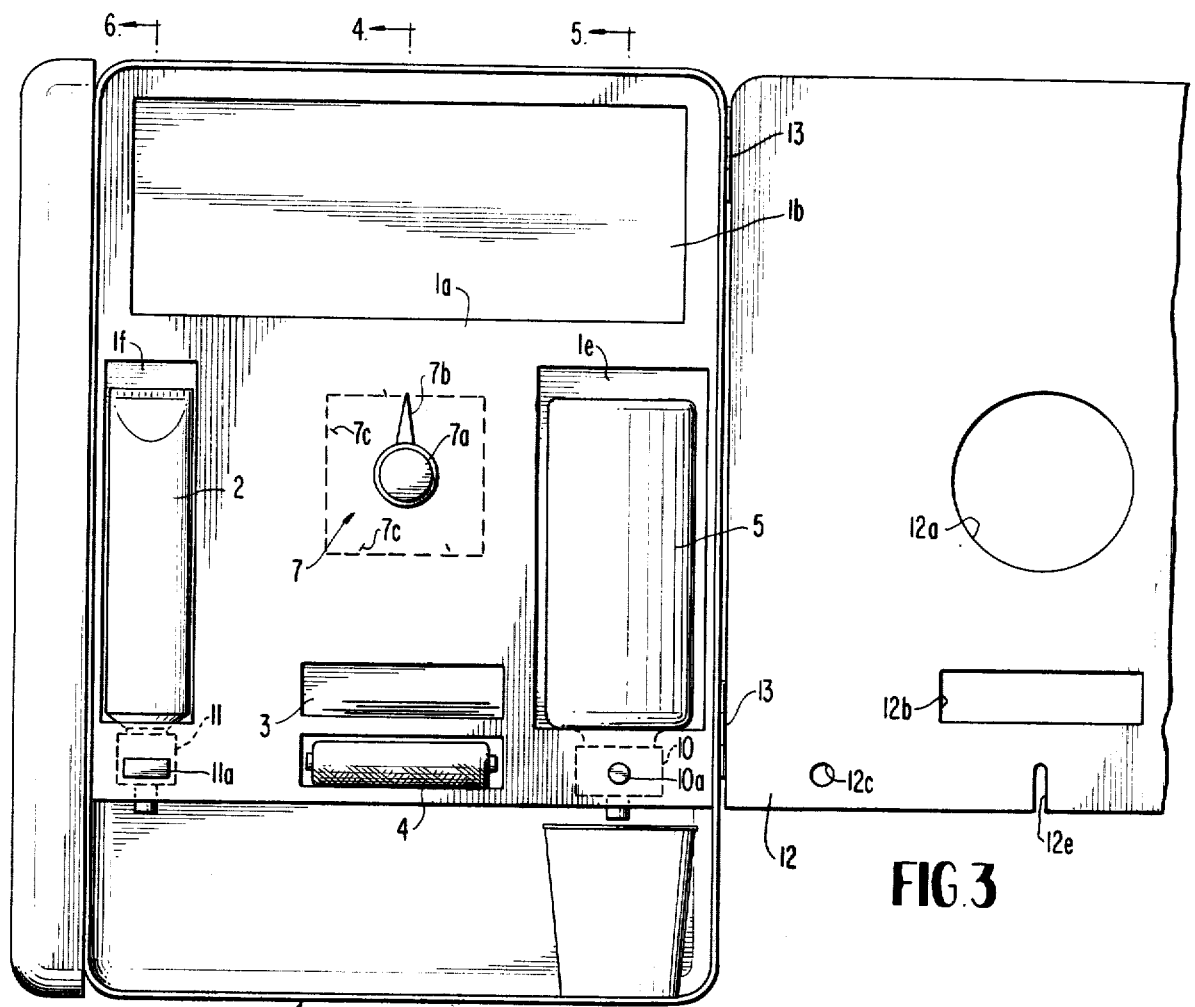
FIG.3
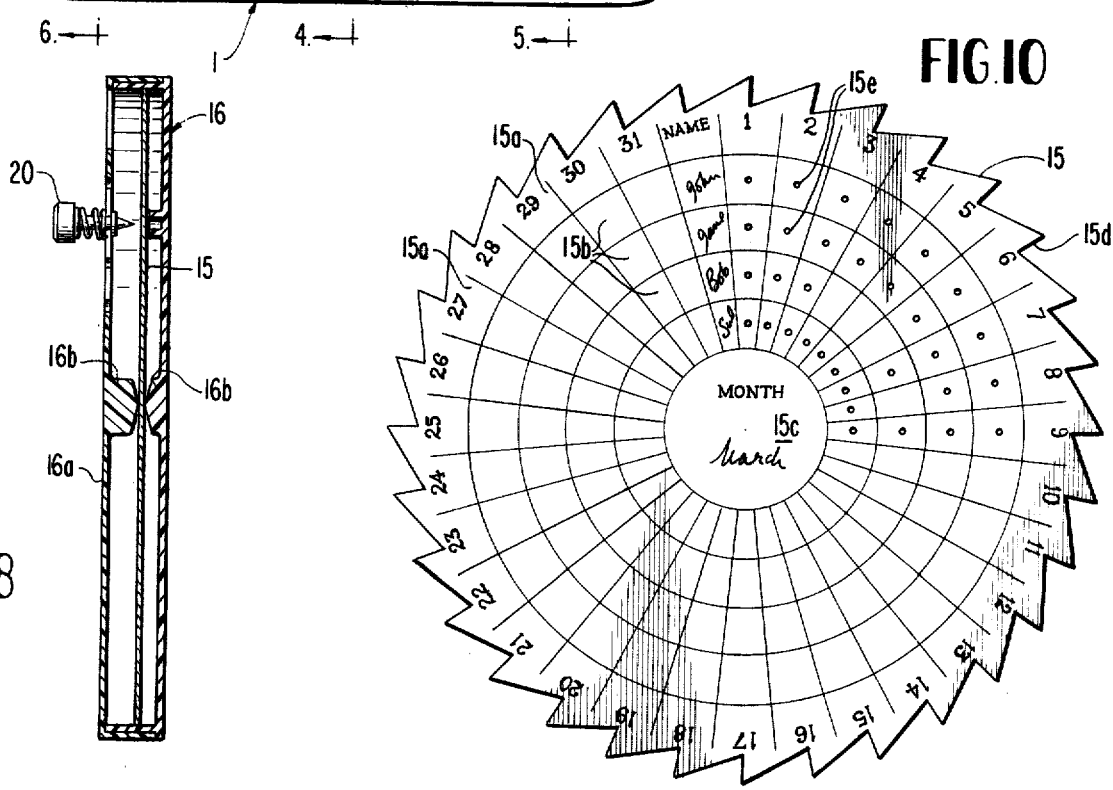
FIG.8
FIG.10

ORAL DISEASE PREVENTION MOTIVATING KIT

BACKGROUND OF THE INVENTION

It is well known that the prevention of oral disease such as dental decay and periodontal disease is often taught to children in the classroom, and to patients in the dentist's office but no matter how much information is disseminated and no matter how the student or patient is approached, it has been found that the main cause for failure in the control of oral disease is the lack of patient motivation, without which, all the preventive procedures, such as, flossing, brushing, fluoridation, etc., are not likely to be practiced, or, at the most, practiced ineffectively.

In order to provide the necessary motivation for an effective oral disease preventive program, the kit of the present invention has been devised which comprises, essentially, a compartmented cabinet containing a 30 to 60 day supply of the required oral disease preventive components such as brush and mirror, perioaids, paste, floss and oral rinse. A timer is also provided in the cabinet which is set by the user for the time allotted for a given procedure, and a program indicator is also mounted in the cabinet for keeping daily records for each user of the motivation kit.

By the construction and arrangement of the cabinet, the preventive supplies will be stored in a permanent place to prevent their being misplaced, and the daily record of the user's preventive program can be presented to the doctor during the patient's dental check-up, whereby the doctor will be able to evaluate the patient's progress and advise accordingly.

DESCRIPTION OF THE DRAWINGS

FIG. 3 is a front elevational view of the cabinet with the cover and an inner door in the open positions;

FIG. 8 is a sectional view taken along line 8—8 of FIG. 7;

FIG. 10 is a front elevational view of the indicator disc employed in the program indicator shown in FIG. 7.

Figure 1:
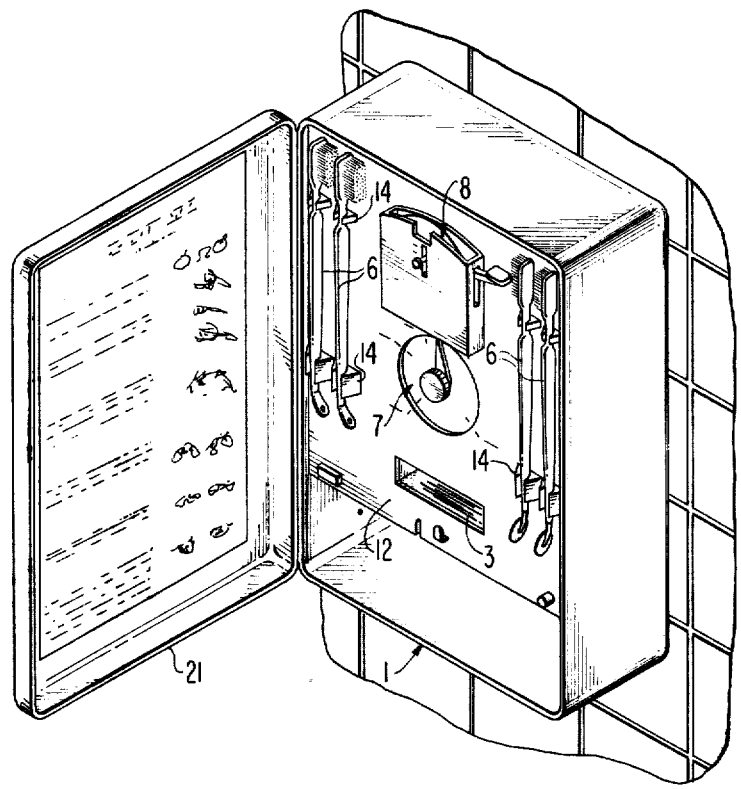
FIG. 1 is a perspective view of the kit of the present invention mounted on a wall with the cabinet cover open.

Referring to the drawings and more particularly to FIGS. 1 and 3 thereof, the oral disease prevention motivating kit of the present invention comprises a cabinet 1 containing a supply of the required oral disease preventive components such as toothpaste with disclosing solution 2, perio-aids 3, dental floss 4, fluoride gel 5, toothbrushes and mirrors 6. An automatic timer 7 and a program indicator 8, the details of which to be explained hereinafter, are also provided in the cabinet.

Figure 2:
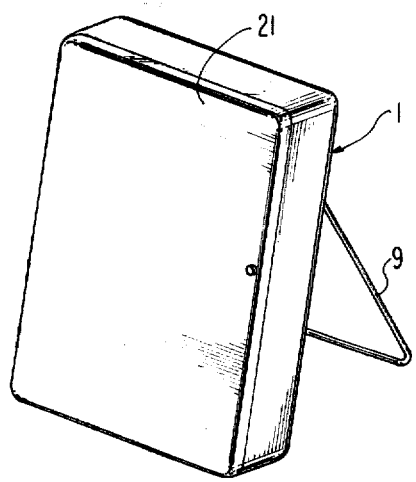
FIG. 2 is a perspective view of the kit of the present invention as a free standing cabinet with the cover closed.
Figure 7:
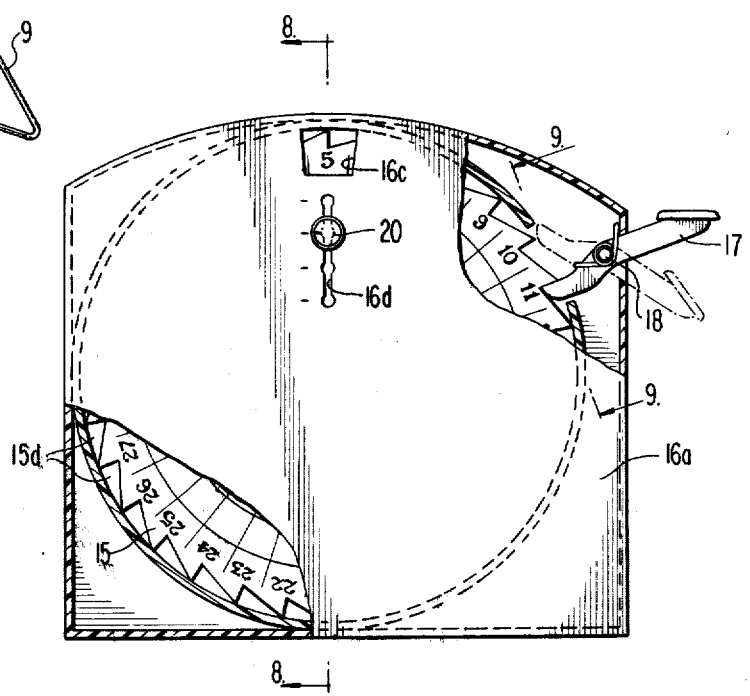
FIG. 7 is a front elevational view of the program indicator with parts broken away showing the indicator disc and indexing device.
Figure 4:
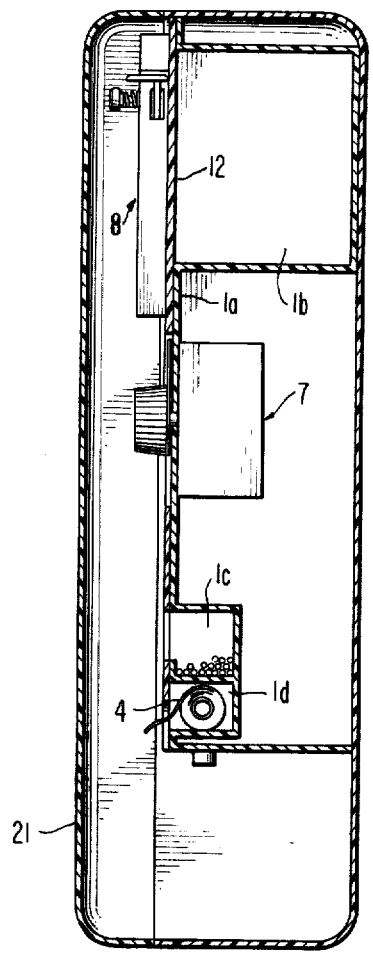
FIG. 4 is a sectional view taken along line 4—4 of FIG. 3.
Figure 5:
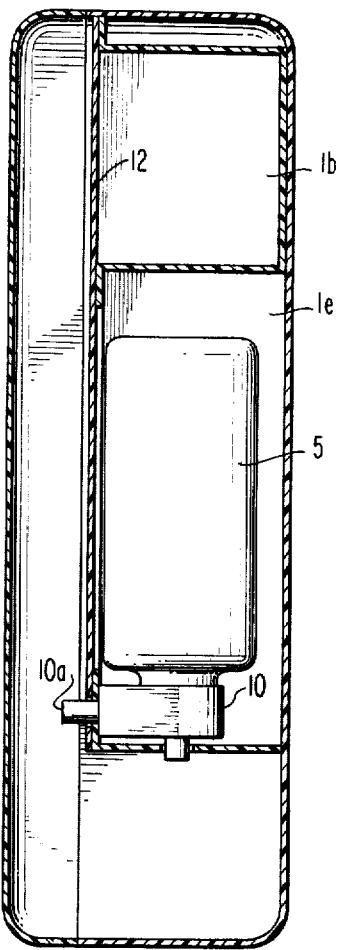
FIG. 5 is a sectional view taken along line 5—5 of FIG. 3.
Figure 6:
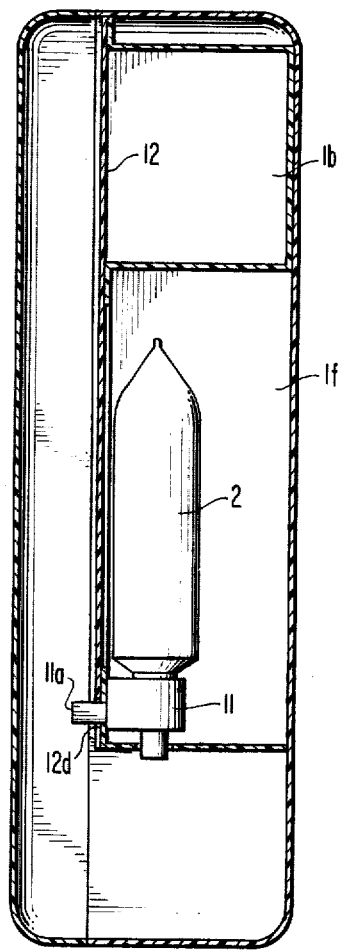
FIG. 6 is a sectional view taken along line 6—6 of FIG. 3.

While the cabinet of FIG. 1 is shown mounted on a wall, it is contemplated that the cabinet can also be adapted to be used in a free standing position as shown in FIG. 2 wherein a supporting leg 9 is pivotally connected to the back wall of the cabinet.

The details of the construction of the cabinet are shown in FIGS. 3 to 6 wherein it will be seen that the interior of the cabinet is provided with a partitioned wall area 1a forming compartments 1b, 1c, 1d, 1e, and 1f for the various oral disease preventive components. The timer 7 is mounted on the wall area 1a and dispensing valves 10 and 11 are mounted in compartments 1e and 1f, respectively, whereby measured amounts of toothpaste and fluoride gel may be dispensed by pressing buttons 10a and 11a.

The timer 7 includes a knob 7a, a pointer 7b and suitable indicia 7c inscribed on the front of the wall area 1a, whereby the pointer can be set to the proper indicia corresponding to the time allotted for a given procedure, such as brushing.

A door 12 is hingedly connected to the side of the cabinet as at 13 to form a closure for the compartments 1b, 1d, 1e and 1f, the door being provided with cut-out portions 12a, 12b, 12c, 12d (FIG. 6) and 12e to accommodate, respectively, the timer knob and dial 7a, 7b; access to the perio-aids 3; the valve buttons 10a and 11a; and the free end of the dental floss 4. If desired, the door 12 may be provided with a suitable lock to prevent unauthorized removal of the oral disease preventive components to thereby prevent the misplacing of the toothpaste, dental floss, etc., which frequently happens when using the conventional family medicine cabinet.

As will be seen in FIG. 1, the front face of the door 12 is provided with a plurality of brackets 14 for holding the toothbrushes 6, and the program indicator 8 is also mounted on the door.

Figure 9:
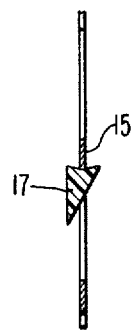
FIG. 9 is a sectional view taken along line 9—9 of FIG. 7.

The details of construction of the program indicator are illustrated in FIGS. 7, 8, 9 and 10 wherein a program disc 15 is provided, the disc being divided into 32 circumferential segments 15a, 31 of which have numbers imprinted thereon to represent the days of the month, and one of which for a user name heading. The disc is further divided into a plurality of radially extending segments 15b, one row of which is aligned with the name heading for receiving the names of the users or members of the family using the oral disease prevention motivating kit, the remaining rows of radially extending segments being aligned with a number representing a respective day of the month. The center 15c of the disc is provided with indicia representing the particular month in which the kit is being used. As will be seen in FIG. 8, the disc is mounted within a housing 16 having a removable cover 16a. The cover and bottom wall of the housing each have inwardly projecting bosses 16b adapted to engage the center 15c of the disc to thereby provide a center of rotation for the disc 15. Referring to FIG. 9, the peripheral edge of the disc 15 is provided with a plurality of notches 15d adapted to be engaged by an indexing lever 17 pivotally mounted to the housing 16 as at 18, the end of the lever being biased into engagement with a respective notch on the disc by a spring 19. A cut-out portion 16c is provided in the housing cover 16a to form a window for exhibiting the indicia representing the day of the month. By the construction and arrangement of the date disc and indexing device, each time the lever 17 is pushed downwardly to the dotted line position, as shown in FIG. 9, the disc will be rotated an increment to exhibit the particular date through the window 16c.

In order to record the completion of the daily program for each user of the kit, a punch 20 is mounted on the housing cover 16a. The punch is slidably mounted in a radial slot 16d formed in the housing cover, whereby the punch may be moved radially relative to the disc in alignment with the row of segments aligned with the particular name of the user, and by pushing the punch inwardly a hole 15e is formed in the disc.

To complete the structural description of the kit, the cabinet is provided with a cover 21 which can be provided with suitable vent openings to insure proper drying of the toothbrushes when the door is closed; the inner face of the door also may be employed as a storage area for instructional material provided with the kit.

In using the kit of the present invention, the timer 7 is set to the allotted time prescribed for a particular function, such as five minutes for flossing or three minutes for brushing, etc. After the person using the kit has completed the particular prescribed functions for the particular day, the punch 20 is aligned with the user's name inscribed on the removable cover 16a and a pin hole is made in the disc 15 by pushing the punch 20 inwardly. The disc 15 is advanced for each day of the month by pressing the lever 17. At the end of each month, the cover 16a is removed from the housing and the disc 15 is removed therefrom and replaced by another disc for the succeeding month. The completed disc is attached to a record sheet which is then presented to the doctor during the patient's dental checkup, whereby the doctor will be able to evaluate the patient's progress and advise accordingly.

From the above description, it will be readily appreciated that the oral disease prevention kit provides the necessary motivation for an effective control of oral diseases particularly within a family since, due to the construction and arrangement of the kit, the various oral disease preventive components will be kept in a permanent place thus preventing various members of the family from removing the components from the cabinet and misplacing them. Also, by each member of the family recording his daily control program, the person who is responsible for the program can readily check the disc to insure everyone in the family is partaking in the control program.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim

1. An oral disease prevention motivating kit comprising, a cabinet having a partitioned wall area providing individual compartments for a plurality of oral disease preventive components such as toothpaste, perio-aids, dental floss, and fluoride gel; a timer including a knob and a pointer mounted in said cabinet adapted to be set to an allotted time prescribed for the various oral disease preventive procedures; and a program indicator mounted in said cabinet for recording the daily oral disease prevention procedures for each user of the kit.

2. An oral disease prevention motivating kit according to claim 1, wherein a door is mounted within the cabinet for closing the compartments, said program indicator being mounted on said door.

3. An oral disease prevention motivating kit according to claim 2, wherein dispensing valve means are mounted within said cabinet and connected to the toothpaste and fluoride gel for dispensing measured amounts of the paste and gel.

4. An oral disease prevention motivating kit according to claim 3, wherein the door is provided with cutout portions to accommodate the timer knob and dial, access to the perio-aids, valve actuators and free end of the dental floss.

5. An oral disease prevention motivating kit according to claim 2, wherein a plurality of brackets are mounted on said door for holding a plurality of toothbrushes.

6. An oral disease prevention motivating kit according to claim 2, wherein said program indicator comprises a housing, a disc rotatably mounted in said housing, indicia provided on said disc representing the days of the month and the various users of the kit, a marker mounted on said housing for recording on said disc the completion of the daily program for each user of the kit, and means for rotating the disc an increment representing each day of the month.

7. An oral disease prevention motivating kit according to claim 6, wherein said housing includes a removable cover, inwardly projecting bosses formed on the removable cover and the bottom wall of the housing, the ends of the bosses engaging the center of the disc to thereby provide a center of rotation for the disc.

8. An oral disease prevention motivating kit according to claim 7, wherein a cut-out portion is provided in the removable cover to form a window for exhibiting the indicia representing each day of the month.

9. An oral disease prevention motivating kit according to claim 6, wherein the means for rotating the disc comprises a lever pivotally mounted on said housing, and a plurality of notches provided on the circumferential edge of said disc, one end of the lever engaged within a notch on the disc, the connection of the end of the lever with the notched disc providing a ratchet action to incrementally rotate said disc when the lever is actuated.

10. An oral disease prevention motivating kit according to claim 6, wherein the marker comprises a punch slidably mounted on said housing and adjustable relative to the disc for aligning the punch with indicia on the housing representing the respective users of the kit, said punch being movable toward the disc to form a hole therein to record the completion of the daily program for the particular user.

* * * * *